N. POTTER.
Bee Hive.
No. 7,970.  Patented March 11, 1851.
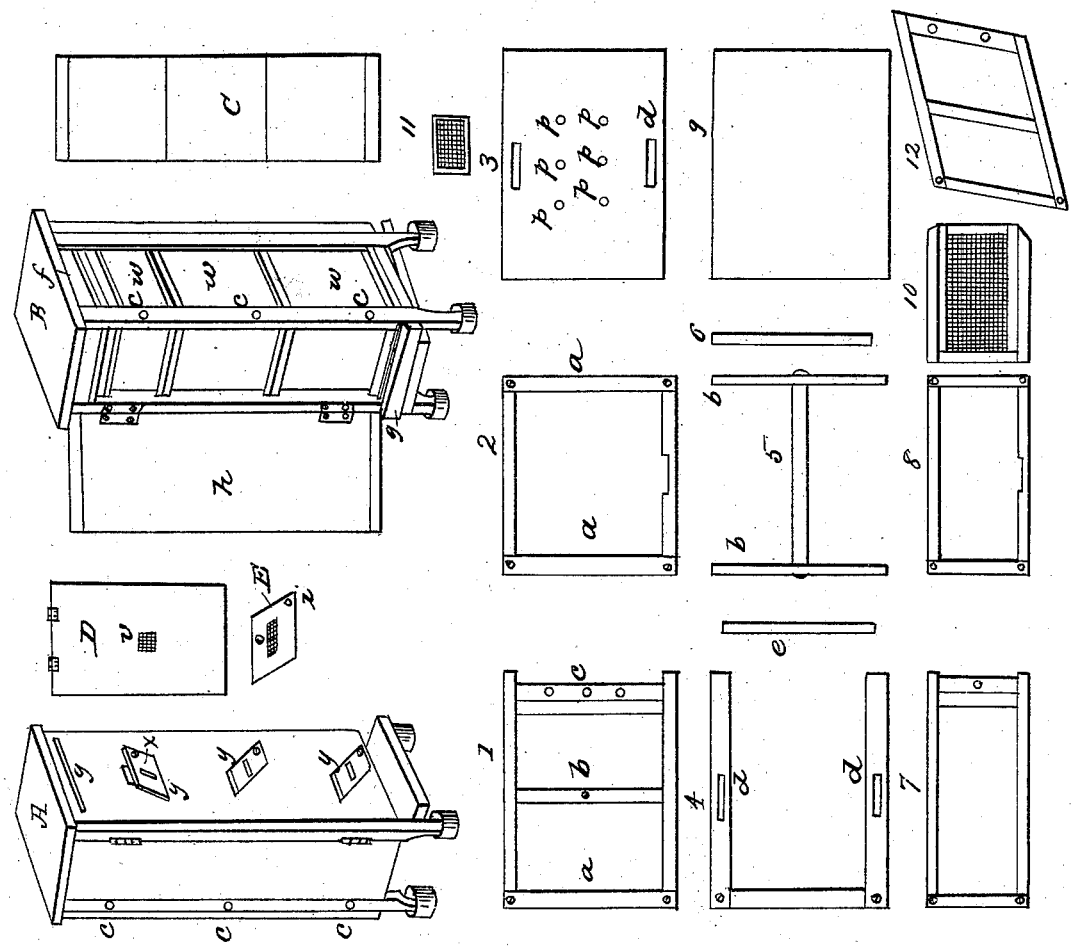

UNITED STATES PATENT OFFICE.

NATHANIEL POTTER, OF BUFFALO, NEW YORK.

USE OF SLIDES IN BEEHIVES.

Specifications of Letters Patent No. 7,970, dated March 11, 1851.

*To all whom it may concern:*

Be it known that I, NANTHANIEL POTTER, of the city of Buffalo, in the county of Erie and State of New York, have invented a new and useful Improvement in Beehives; and I do hereby declare that the following is a full, clear, and exact description of the same, reference being had to the accompanying drawings, making part of the same, in which—

Figure A represents the hive when ready for use. Fig. B represents the hive with the doors thrown open and showing the interior arrangement. Figs. C, D, E, 1, 2, 3, 4, 5, 6, 7, 8, 9, 10, 11, 12, are details of the various parts of the hive.

My hive is constructed with a passage for the entrance of the bees to each box, one of these passages is represented as open at $x$, Fig. A, the other two $y$, $y$, closed. The entrance to the several boxes are so arranged that either or all of them may be covered by a ventilating button represented by Fig. E. This button has a slot $o$, through its middle over which wire-gauze is placed, so that when the entrance is closed at night against the moth, or for the purpose of ascertaining whether the bee-box is provided with a queen bee, preparatory to dividing to increase the number of swarms, to guard against robber bees, or for other purposes, a free ventilation is kept up at the front as well as at the rear of the bee-boxes. This button is secured to the hive by a single screw $i$, Fig. E, at one of its corners so as to swing over the entrance to the hive. When the entrance to the hive is open, the button $x$, Fig. A, answers for a rest for the bee to alight upon before entering the hive. Fig. B, shows the interior of the hive, and the arrangement of the boxes $w$, $w$, $w$, which are made the top of wood the four sides and bottom of glass except small strips of wood at the edges serving as a frame to connect the glass, for the purposes of ventilation and affording passages for the bees. These boxes are ventilated not only through the wire-gauze slide (Fig. 10) placed over the holes $p$, $p$, &c. Fig. 3, at the top, but also at the rear of the sides through wire-gauze upon the outer side of the box as represented at $c$, Fig. 1. The outer case may also be ventilated through wire-gauze as represented at $c$, &c. Figs. A, & B, but care should be taken not to ventilate directly opposite the ventilations in the boxes least a current of cold air pass from without directly among the bees, so as to annoy and sometimes prevent their working in the summer and freeze them in the winter. This arrangement though simple will be found to be of more practical importance than superficial observers may at first imagine. The boxes rest one upon the other except when a box is to be removed, when a thin metal plate is slid between the boxes and guided by grooves in the sides of the hive, the upper box then rests upon this plate and the lower box is removed and another box inserted in its place. At the rear of the boxes $w$, $w$, $w$, there is another metal plate which closes up an opening left for the purposes of cleaning the boxes when necessary.

The wire-gauze slide Fig. 10, is used for separating the communication between the boxes when it is necessary to drive the bees from a box which is to be removed to one of the others, and at the same time allow the air to pass through it. The small slide Fig. 11, is used in like manner for separating the communications at the sides as shown at letter $d$ Fig. 3.

The bottom of the hive Fig. D, is hung to the frame by hinges, so as to be easily opened and closed, it also has a hole $v$, through it covered with wire-gauze so as to admit air from the bottom.

The communication between the boxes are through the slots $d$, $d$, which are made to correspond—also through the holes $p$, $p$, $p$, &c. Fig. 3 by removing the glass at the bottom of the box which is easily done as it is made to slide in grooves for that purpose.

Above the boxes $w$, $w$, $w$, Fig. B and between them and the top of the hive is an apartment $f$, for catching the moth, the entrance to which is immediately over the bee entrance and shown at $g$, Fig. A. The bottom of this apartment has holes in it corresponding to the holes in the box immediately below it and shown at $p$, $p$, $p$, &c. Fig. 3. Over these holes I place glass, paper, or other thin material, (which can easily be removed when the season requires it,) so as entirely to close the communication between this apartment and the box below it, yet at the same time to allow the breath and warmth of the bees below in the hive to come up against the glass, paper or other material which will warm it sufficiently to attract the moths where they will remain until removed by opening the door in the rear of the hive. (Figs. B, $h$). On this glass or paper I place old comb or other suitable material, as an additional attraction and harbor for the moth. I also place old comb in the moth apartment at the bottom of the hive.

When the parts are properly arranged I set the feet of the hive in cups of water saturated with salt which effectually protects the bees from ants and other insects at the bottom.

Having thus fully described my invention, what I claim therein as new and desire to secure by Letters Patent is—

The manner herein described of affording the moth apartment with glass, paper or other thin material overlaying the vent holes in the top of the box, said glass or paper having placed upon it old comb or other suitable material so as to be warmed by the bees in the boxes below, & ventilated as described, thus attracting the moths into said apartment while they are at night entirely excluded from the bee-boxes by means of the ventilating buttons as described.

2. I also claim the arrangement by which the upper box or boxes are held in their places while the one below is removed and another inserted in its place.

3. Also the arrangement at the rear and bottom of each box by which the tin slide is removed thus allowing a convenient opportunity for clearing the bottom of the bee-boxes as described.

NATHANIEL POTTER.

Witnesses:
  THOS. BLANCHARD,
  A. B. STOUGHTON.